July 10, 1951 K. F. GAUSCH 2,560,432
RUNWAY MARKER LIGHT
Filed Oct. 23, 1947 2 Sheets-Sheet 1
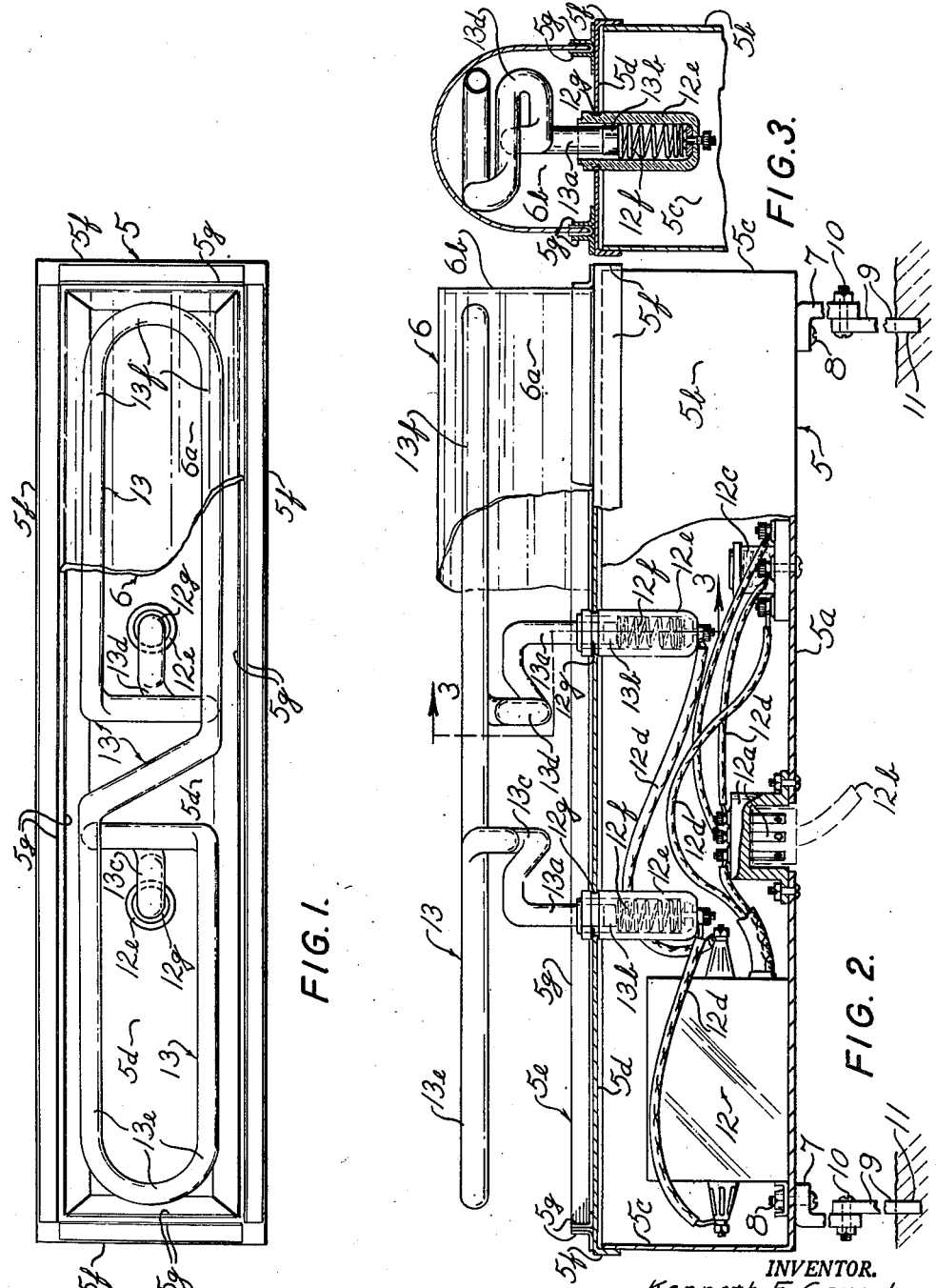
INVENTOR.
Kenneth F. Gausch
BY
Atty July 10, 1951   K. F. GAUSCH   2,560,432
RUNWAY MARKER LIGHT
Filed Oct. 23, 1947   2 Sheets-Sheet 2
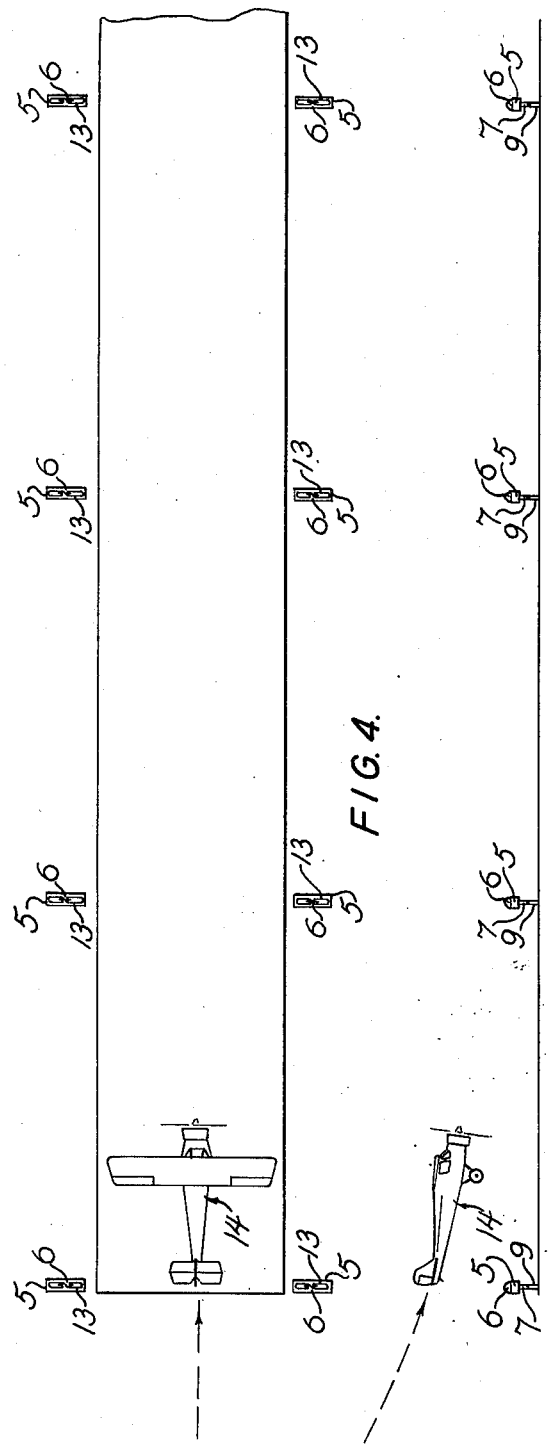
FIG. 4.
FIG. 5.
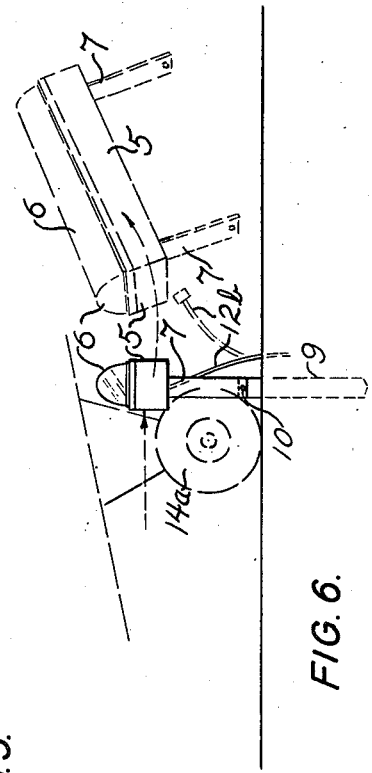
FIG. 6.
INVENTOR.
Kenneth F. Gausch
BY Patented July 10, 1951

2,560,432

UNITED STATES PATENT OFFICE 2,560,432

RUNWAY MARKER LIGHT

Kenneth F. Gausch, St. Louis, Mo.

Application October 23, 1947, Serial No. 781,701

4 Claims. (Cl. 240—1.2)

This invention relates to the run-way lights of airplane landing fields or strips, with especial reference to the placing and positioning of such lights relative to the field, as well as the specific form of the individual light units as best adapted for the purpose of properly illuminating such field or strip.

In making a landing upon an oblong landing field or strip, it is desirable that the pilot, in approaching the field from a distance, have the field well lighted and outlined by a plurality of run-way lights mounted in suitably spaced relation along the lateral margins or side lines of the field, and so that he may set his course for a proper landing. But as he nears the field it is also desirable that the direct and relatively strong rays of light as reaching the pilot's eyes, be relatively lessened and subdued, so that he may not be blinded or confused in the process of landing.

It is the chief object of the present invention therefore, to provide a special form of lighting unit best adapted for demarking and outlining a landing field in the manner above referred to, as well as the provision of such a landing field or strip as thus illuminated, and whereby the field is well outlined and defined for a pilot approaching the field at a distance, but as he nears the field and enters the same for landing, the illumination and the direct rays of light as reaching the pilot's eyes, are substantially lessened and subdued and their otherwise blinding effects are eliminated.

Another object of the invention is to provide, in and for a landing field illuminating system of the kind referred to, a lighting or illuminating unit comprising an elongated housing with lighting elements extended there-along from end to end thereof, and thus adapted for positioning horizontally and perpendicularly at a lateral margin or side line of the landing field, and whereby a plurality of such units, as arranged and extended in suitably spaced relation at both sides of the field, will serve efficiently to outline, illuminate and define the field in the manner above described.

Another object of the invention is to provide a lighting and illuminating unit of the kind referred to, for positioning at an airplane landing field, the said unit comprising an elongated housing, an electrical transformer and accessories in the housing, a system of neon light tubes extended along the upper side of the housing from end to end, the said tubes being operatively connected at their terminals with the transformer within the housing, a transparent or translucent cover for the neon tubes, and springs incorporated at the terminals of the transformer for engaging the contacts of the terminals of the neon tubes, for resiliently pressing the tubes upwardly against the said cover for warming same in snowy or icy weather and thus preventing such snow or ice from accumulating thereon, Another object of the invention is to provide an elongated form of lighting unit for positioning perpendicularly at a side line of an airplane landing field, whereby a relatively lengthened broadside or spread of light will be afforded a pilot as he approaches the field from a distance, but a much shorter endwise spread of light as he enters upon the field in landing, thus preventing his becoming blinded or confused by an excess of light.

With the above stated objects in view, together with such other and additional objects and advantages as may appear from the specification, attention is now directed to the accompanying drawing as embodying a preferred form of the invention, and wherein:

Figure 1 is a top plan view of one of the lighting units as contemplated by this invention, a portion of the cover being broken out to show more clearly the formation and the elongated extension of the neon tubes upon the top of the underlying housing.

Figure 2 is a side elevation of one of the light units as mounted upon the ground at a landing field, portions of the housing and cover being broken out, and portions being shown in section.

Figure 3 is a section on the line 3—3 of Figure 2.

Figure 4 is a plan view of one end of a landing field or strip, showing same as demarked and defined along its lateral margins or side lines by a plurality of the described lighting units as positioned in perpendicular relation thereto, and showing an airplane as entering upon this end of the field in the process of landing, the said lighting units being reduced in scale as compared to succeeding views.

Figure 5 is a side elevation of the landing field or strip as shown in Figure 4.

Figure 6 is a view upon an enlarged scale, illustrating the sequence of action in the event an incoming airplane in the process of landing should strike one of the lighting units, and break same away from its ground anchorage, said ground anchorages comprising legs especially designed to meet such contingency.

This invention comprises an elongated lighting or illuminating unit represented generally at 5, and which includes a basal housing rectangular in cross section and made up of a bottom plate 5a, side plates 5b, end plates 5c, and a removable top plate 5d, the latter being provided with a flanged frame 5e anchored upon its upper face, the said frame including the down-turned flanges 5f for frictionally engaging the upper margins of the ends and sides of the housing, and the up-turned flanges 5g for receiving and holding the lower margins of the transparent or translucent cover or hood 6, which is constructed of any suitable material, such as sheet-plastic or shatter-proof glass. This cover or hood is formed semi-circularly in cross-section (see Figure 3) to provide the pendant sides 6a, and the ends are closed as at 6b by similar transparent or translucent sheet material. As thus formed this cover is adapted to removably seat within the flanges 5g of the top plate 5d.

Angular leg brackets 7 are bolted as at 8 centrally to the under side of the ends of the bottom plate 5a (see Fig. 2) of the housing, and legs 9 are bolted at 10 to the down-turned ends of these brackets. The bolts 10 are slender brass bolts to guard against rusting off, but are fragile enough that in case the unit is struck by an incoming airplane, they will break off for the purpose of separating the brackets, housing and cover from the lower and grounded ends of the legs, thus preventing the unit as a whole from being broken up and smashed. In mounting the unit 5 at an airplane landing field, the lower legs 9 are seated in the ground, as indicated at 11 in Figure 2.

Within the housing there is mounted a standard form of electrical transformer, referred to generally at 12, and which includes all of the usual elements and accessories of such instruments, such as the three-point intake socket 12a for leading the electric current inward through the wires 12b, the grounded fuse box 12c, the interior wiring 12d for operatively connecting the transformer with the other elements of the instrument, including the fuse box and the receptacles 12e, the latter being in the form of glass tubes or sleeves within which are seated the coiled spring contacts 12f. These receptacles are vertically positioned and open upwardly through the top plate 5d of the housing, as shown at 12g in Figures 1, 2, 3, in medially spaced relation.

On the top plate 5d and extended from end to end thereof, there is mounted a system of lighting elements, here represented as neon light tubes and referred to generally at 13. These tubes and the several bends and loops thereof are all integrally and operatively connected and so as to constitute in effect a single lighting unit, including the spaced and down-turned terminal ends 13a (Figures 2, 3) designed, arranged and adapted to pass freely down into the receptacles 12e, and provided at their extremities with the contacts 13b which seat upon the spring contacts 12f of the receptacles for energizing the gas filled tubular element or unit 13, in conventional manner, through the transformer 12. From these terminal portions 13a of the neon lighting unit, convoluted riser loops or whorls 13c, 13d, are centrally extended and positioned, the general effect of which loops and whorls is to substantially augment and increase the flood or stream of light emanating from the unit as a whole as positioned perpendicularly at a side line of an airplane landing field or strip. From the convolutions, loops and whorls 13c, 13d, elongated and integrally formed loops 13e, 13f, are extended outwardly towards each end of the top plate 5d, in a common horizontal plane passed through the top ends of the riser loops, by which arrangement and relative positioning of the riser loops and whorls, and the said elongated loops of the neon tubes as extended towards the ends of the top plate, the rather concentrated floods of light as emanating from the central cluster of loops and whorls, while passing freely outward and upward on lines generally perpendicular to the elongated lighting unit as the latter stands positioned horizontally and perpendicularly to a side line of the landing field, are materially intercepted, obstructed and obscured in respect of their projection towards the landing field itself. Thus an approaching pilot, while at a distance from the landing field and at comparatively high elevation, may readily discern the lay-out of the field, as illuminated and outlined by a plurality of such lighting units ranged along each side of the field, as he nears and enters the field the otherwise blinding effects of the lighting units are lessened and subdued owing to the end-wise positioning of the units relative to the side lines of the field, and so that the pilot may make his landing in safety. In other words, the pilot has an elongated spread of light at each side of the field as he approaches same from a distance, but a materially shortened and subdued spread of light as he enters the field for landing.

These and other advantages result from the construction of the individual lighting assembly units and the arrangement of these assembly units relative to the runway, as indicated, for instance, in Fig. 4. Each assembly is of generally oblong contour in plan view, and each is positioned with its direction of length extending normal to the direction of length of the runway and practically symmetrical to the side limits of the latter. Since the assembly units are in spaced relation, and each has a width materially less than its length, in addition to which the lighting zone of the unit is supported by the ground surface but so positioned as to be located materially above such surface, thus enabling the length, width and depth of the zone to be active as a beacon-like development such as will enable the pilot, in flight, to not only determine the limits of the runway but also facilitate the accuracy of his approach thereto through the varying effects set up when approaching the field from different directions.

For instance, assuming the plane to be approaching from the left in Fig. 4, and the pilot sights the runway from a considerable distance out, the succession of assemblies on each side of the runway would tend to present the appearance of parallel bands, the width of which would be provided by the length dimension of the assembly units. The widths between successive units would depend upon the altitude of the plane at the time of observation, the distance decreasing as the plane altitude decreases. Hence, as the pilot approaches and loses altitude, the width of the band is not affected, but the change in angularity of flight affects the spacing and as a result the pilot has a visual tell-tale which enables him to make the proper approach by noting the varying developments in these respects as he makes his approach. When directly overhead the units appear as individuals, a fact which is emphasized by the seeming decrease in width of an assembly unit and in the approach he sees the top and side of the assembly, but overhead the top alone is visible.

If the pilot is approaching from the side, it is instantly known from the fact that the assembly units are individual and the distance between them does not change during the approach, as the ribbon-like effect is absent. If approaching from an angle, varied effects would be set up dependent on the particular angle, but each would differ from the appearance set up either by end or by side approach. Knowing the meaning of each of all of the different variations in effect set up, the pilot, watching the character of the developments produced by his advance, is instantly able to detect undesired conditions and take his remedial measures, even in advance of needing to know the defining limits of the runway. As a result, he is able to bring his plane into proper relation with the runway with rapidity and accuracy through the aid given to him through the varying developments of variations in beacon-like effects produced by the assemblage of units as his plane advances in flight.

While the central zone of a lighting element may tend to provide an intensifying of the light within the zone, due to the conformation of the element within the zone, this does not affect the above indicated aid conditions due to the fact that the end extensions are each of material length and serve to present the beacon-like effects and their defining characteristics in the manner indicated. Any intensifying effect of the central zone could increase the visibility distance of the assemblage, but does not affect or mislead the pilot, since the expected end zone lighting becomes visible quickly to set up the complete characteristics of the beacon.

Another of the characteristic features produced by the assemblige is the material difference between the lighting intensity of the runway itself and the marginal zones lying outside of the sides of the runway. Since the shape of the unit and its particular position relative to the runway are such to present the width of the unit, provided by the end of the oblong contour, as facing the runway, while the unit sides illuminate the marginal zones, it can be be understood that the dominant lighting effect is with the marginal zones, the runway itself presenting subdued lighted conditions. In other words, the runway appearance to the approaching pilot is of somewhat sharply defined contrasting type with the runway itself having the less intense lighting. This provides a clearer delineation of the side limits during the approach, and at the same time avoids the presence of blinding effects in the path of the pilot. Inasmuch as the plane of the end zone of the lighting element is materially spaced above the ground level and relatively narrow, the diameter of the tube, the light dispersion provides the subdued lighting of the runway with the light intensity sufficient to reveal the surface but without liability of blinding the pilot.

In addition, the particular manner in which the units are supported is of importance. As indicated in Figs. 2 and 6, the entire assembly unit is carried by feet, the latter being in two parts connected by a frangible bolt, the feet being located in the end zones of the unit. The lower part of each foot extends into the ground to anchor the unit, with the upper part carried by the under face of the unit, and since the position of the unit is such as to present its side in the direction of an oncoming plane, the bolt connection is so arranged that the impact, if present, will be in a direction to sever the bolt between the foot sections. As a result, should the plane veer out of the runway sufficient to strike a unit, the entire unit will be bodily released by the breaking of the bolts, leaving only the smal portion of the lower foot section as projecting, and since this is relatively short and of small size, is not likely to damage the plane, while the bodily release of the unit as an entirety, provides practically no material damage to the unit by the accident, thus minimizing the possibility of damage to unit or plane by the mishap.

In the use of these lighting units as located at the sides of a landing field in the manner described, as the covers of the units are pushed downward to their seats upon the top plates, the coil springs 12f are compressed, and thus certain upper portions of the neon tubes are held closely up against the covers, whereby the covers are kept sufficiently warm in snowy or icy weather to prevent the accumulation of snow or ice thereon, and which would obscure the illuminating effect of the units.

While neon lighting tubes are here shown and described as preferred means of illumination, any other lighting and illuminating means might be employed if desired, provided they were extended in elongated form upon an underlying base, and included a centrally mounted and relatively reinforced and strengthened light cluster for projecting increased floods of light upwardly and outwardly towards an approaching airplane, with means for relatively lessening, obscuring and subduing the rays of light projected towards the landing field itself.

And while I have here shown and described a preferred form and embodiment of the invention, together with preferred structural features thereof, the embodiment and specific features as shown may be changed or modified as desired, within the scope however of the appended claims. The use and operation of the invention will be fully understood from the foregoing description, taken in connection with the drawing.

I claim:

1. A lighting assembly unit for use in run-way lighting assemblies of airplane landing fields, such assembly unit comprising a casing of oblong contour in plan view, said casing containing a lighting element system of elongated type adapted to provide a lighting zone of approximately oblong contour form, said casing also containing a transformer for rendering the elements active, said casing including a cover overlying the lighting element system, said cover being arcuately curved in cross section and positioned to locate the element system below and extending within the concave face of the cover, said cover having its curved portion and a zone of at least one end thereof formed of material permitting light emission therethrough, said casing being mounted on feet to permit the unit to be positioned as materially spaced from the ground surface with the feet extending into the ground to fixedly position the unit, the said unit being characterized in that the lighting element system is in the form of tubular elements of the neon type with the elements shape to provide the approximately oblong contour in the plan view and having the end zones of the contour provided by whorls extending from the central zone in a general planar formation, the plane of the formation extending normal to the radius of curvature of the cover to thereby position the system as symmetrical to and within the cover.

2. An assembly unit as in claim 1, characterized in that the whorls of the system extend from the central zone with the latter carrying the contact formations for operatively connecting the system with the transformer.

3. An assembly unit as in claim 1, characterized in that the central zone of the lighting element system includes cross-runs to thereby increase the light intensity of the zone.

4. An assembly unit as in claim 2, characterized in that the contact formations include spring means operative to move the tubular system into proximity with the under face of the cover to thereby utilize the heat of the system as a de-icing means for the cover.

KENNETH F. GAUSCH.

REFERENCES CITED

The following references are of record in the file of this patent:

UNITED STATES PATENTS

| Number | Name | Date |
| --- | --- | --- |
| 755,307 | Moore | Mar. 22, 1904 |
| 1,210,851 | Schaefer | Jan. 2, 1917 |
| 1,860,685 | Morris | Mar. 31, 1932 |
| 2,015,442 | Sprung | Sept. 24, 1935 |
| 2,038,506 | Cadieux | Apr. 21, 1936 |
| 2,247,160 | Sharpe | June 24, 1941 |
| 2,264,689 | Yost et al. | Dec. 2, 1941 |
| 2,501,437 | Cline et al. | Mar. 21, 1950 |

FOREIGN PATENTS

| Number | Country | Date |
| --- | --- | --- |
| 497,163 | England | Dec. 14, 1938 |